United States Patent [19]

Kobayashi et al.

[11] Patent Number: 5,098,776
[45] Date of Patent: Mar. 24, 1992

[54] SHAPE MEMORY FIBROUS SHEET AND METHOD OF IMPARTING SHAPE MEMORY PROPERTY TO FIBROUS SHEET PRODUCT

[75] Inventors: Kazuyuki Kobayashi; Shunichi Hayashi, both of Nagoya, Japan

[73] Assignee: Mitsubishi Jukogyo Kabushiki Kaisha, Tokyo, Japan

[21] Appl. No.: 427,172

[22] Filed: Oct. 25, 1989

[30] Foreign Application Priority Data

Oct. 28, 1988 [JP] Japan .................. 63-270908

[51] Int. Cl.$^5$ ............................... B32B 5/16
[52] U.S. Cl. ......................... 428/283; 427/389.9; 427/392; 428/240; 428/264; 428/265; 428/402; 428/423.1
[58] Field of Search ............... 428/283, 240, 248, 402, 428/264, 265, 423.1; 427/389.9, 392

[56] References Cited

U.S. PATENT DOCUMENTS

| | | | |
|---|---|---|---|
| 3,218,185 | 11/1965 | Letteron | 428/240 |
| 3,684,639 | 8/1972 | Heberle et al. | 428/240 |
| 4,182,649 | 1/1980 | Isgur et al. | 428/240 |
| 4,551,381 | 11/1985 | Inoue | 428/240 |

FOREIGN PATENT DOCUMENTS 252353 11/1986 Japan .

*Primary Examiner*—James J. Bell
*Attorney, Agent, or Firm*—McAulay Fisher Nissen Goldberg & Kiel

[57] ABSTRACT

A fibrous sheet having the shape memory property which comprises a sheet made of natural fiber and/or synthetic fiber and a layer formed by applying a powder of shape memory polymer; and a method of imparting the shape memory property which comprises applying a powder of shape memory polymer to a desired part of a product of a sheet made of natural fiber and/or synthetic fiber by the aid of a resin adhesive.

10 Claims, 1 Drawing Sheet

SHAPE MEMORY FIBROUS SHEET AND METHOD OF IMPARTING SHAPE MEMORY PROPERTY TO FIBROUS SHEET PRODUCT

FIELD OF THE INVENTION AND RELATED ART STATEMENT

The present invention relates to a shape memory sheet made of natural fiber and/or synthetic fiber and to a method of imparting the shape memory property to a sheet of natural fiber and/or synthetic fiber. (The term "sheet" means a woven fabric or nonwoven fabric hereinafter.)

Among the known conventional fibrous sheets are woven fabrics and nonwoven fabrics made of natural fiber or synthetic fiber or a mixture thereof.

There has recently been proposed a nonwoven fabric made of a shape-memory nonwoven fabric composed of a shape memory resin fiber and a shape memory resin adhesive. (See Japanese Patent Laid-open No. 252353/1986.) It is expected to find a variety of uses.

Nonwoven fabrics in general have the following disadvantages because they are formed by bonding short fibers with an adhesive.

(1) They tend to be thicker.
(2) They tend to have an uneven thickness and strength because the uniform distribution of the adhesive is difficult to achieve.
(3) They are liable to high production cost on account of the adhesive.

The nonwoven fabrics made of the conventional shape memory resin mentioned above are also subject to these disadvantages. In addition, they pose the following problems if they are to be combined with natural or synthetic long fibers or yarns.

(1) An additional step is necessary to cut natural or synthetic long fibers or yarns as short as the fiber of the shape memory resin.
(2) Another additional step is necessary to laminate an ordinary woven fabric of natural or synthetic long fibers or yarns onto a nonwoven fabric composed of fibers of a shape memory resin and an adhesive of a shape memory resin, with an adhesive.
(3) These additional steps, in addition to the expensive adhesive, increase the production cost further.

To address these problems, the present inventors previously proposed a method of producing a woven fabric, in place of nonwoven fabric, from a fiber of shape memory polymer alone or in combination with a natural or synthetic fiber. (See Japanese Patent Application No. 259525/1988.)

OBJECT AND SUMMARY OF THE INVENTION

The present invention was completed to impart the shape memory property to not only woven fabrics but also nonwoven fabrics without causing the above-mentioned problems.

Accordingly, it is an object of the present invention to provide a fibrous sheet having the shape memory property which comprises a sheet made of natural fiber and/or synthetic fiber and a layer formed by applying a powder of shape memory polymer. "Shaped memory polymer" is defined as one which undergoes large changes in its modulus of longitudinal elasticity around its glass transition point temperature. The polymer can be molded into a desired shaped at a temperature above the glass transition point and below a temperature of incipient fluidization. The polymer typically becomes rubbery at a temperature above the glass transition point temperature and becomes glassy and fixes it shape as deformed at a temperature below the glass transition point temperature. A shape memory polymer restores its original shape when heated to a temperature higher than the glass transition point temperature. It is another object of the present invention to provide a method of imparting the shape memory property which comprises applying a powder of shape memory polymer to a desired part of a product of a sheet made of natural fiber and/or synthetic fiber by the aid of a resin adhesive.

The fibrous sheet of the present invention is composed of a sheet (woven fabric or nonwoven fabric) of natural fiber and/or synthetic fiber and a layer formed thereon by applying a powder of shape memory polymer. The powder of shape memory polymer is caught by interstices between natural fibers and/or synthetic fibers and also by the surface irregularities of the sheet.

The fibrous sheet of the present invention produces the following effect if the shape memory polymer has an adequate glass transition point (Tg for short hereinafter) and the shape memory property is adequately imparted to the sheet.

In the case where the shape memory polymer has a Tg lower than normal temperature (say, about $-5°$ C.) and the shape memory property is imparted at a temperature considerably higher than the Tg (say, a temperature at which the polymer is about to begin to flow), the shape memory property is imparted to the sheet in the following manner. That is, the sheet of the present invention which has been cut to a desired size is placed in a mold capable of molding the sheet into a desired shape, heated to and kept at a temperature at which the polymer is about to begin to flow, and finally cooled to normal temperature.

The thus obtained sheet gives the same soft hand as ordinary woven fabrics or nonwoven fabrics when used at normal temperature, which is higher than the Tg. Moreover, it does not wrinkle nor deform even when it is washed or left in a wardrobe for a long time.

If the sheet of the present invention contains a powder of shape memory resin having a Tg lower than normal temperature and has the shape memory property imparted at a temperature considerably higher than a Tg, it may be favorably applied to the creases of slacks and the pleats of skirts.

If the shape memory polymer has a Tg higher than normal temperature (say, about 40° C.) and the shape memory property is imparted at a temperature at which the polymer is about to begin to flow, the resulting sheet will give a hard hand when used in the ordinary manner at normal temperature. And it may wrinkle or deform when it is washed or left in a wardrobe for a long time. In such a case, however, it easily returns to its original shape (free of wrinkles and deformation) upon heating above the Tg.

Therefore, the sheet of the present invention will be favorably applied to the collars, cuffs, and shoulder pads of utility shirts, if it contains a shape memory polymer having a Tg higher than normal temperature and has the shape memory property imparted at a temperature higher than the Tg.

If the shape memory polymer has a Tg higher than normal temperature (say, about 40° C.), the shape memory property may be imparted by heating and softening at a temperature slightly higher than the Tg (instead of a high temperature at which the polymer is about to begin to flow). The resulting sheet remembers the shape given while it is soft, when it is cooled below the Tg.

The sheet prepared in this manner gives a hard hand when it is used at normal temperature, which is lower than the Tg, as in the above-mentioned case. Even when it wrinkles or deforms after washing or prolonged storage in a wardrobe, it easily restores its original shape it remembers, eliminating wrinkles or deformation, upon heating above the Tg. Therefore, it may also be favorably applied to the collars, cuffs, and shoulder pads of utility shirts.

Incidentally, if the shape memory polymer has a Tg lower than normal temperature (say, about $-5°$ C.) and the shape memory is imparted by heating and softening at a temperature slightly higher than the Tg as mentioned above, the resulting sheet cannot be used in the memorized shape at normal temperature, which is higher than the Tg. However, it may be used in the memorized shape at low temperatures below $-5°$ C. in some special districts or under special conditions.

It is impossible to impart the shape memory property at a high temperature as mentioned above if the synthetic fiber constituting the sheet of the present invention does not endure the high temperature at which the shape memory polymer is about to begin to flow. Therefore, an adequate method of imparting the shape memory property should be selected in consideration of not only the intended application but also the heat resistance of the synthetic fiber.

According to the present invention, the shape memory property resorts to a powder of shape memory polymer which remains in the interstices between fibers and sticks to the surface irregularities of the sheet. Therefore, the powder should have an adequate particle diameter so that it deforms under pressure which is applied when the shape memory property is imparted. In other words, the particle diameter should preferably be slightly larger than the diameter of the fiber to be used.

The powder of shape memory polymer affects the shape memory property according as its amount. The greater the amount, the easier it is to impart the shape memory property. With a small amount of power, it would be difficult or impossible to impart the shape memory property. The desirable amount should be 10 to 95 wt % of the fibrous sheet (before powder application).

As the shape memory polymer that can be used in the present invention may be cited urethane polymers, styrenebutadiene polymers, crystalline diene polymers, and norbornane polymers. Their Tg can be freely controlled by properly selecting the kind of the raw materials (monomers, chain extenders, etc.) and their mixing ratio.

These polymers may be made into powder preferably by so-called cryogenic grinding, in which the polymer in pellet form is cooled to an extremely low temperature with liquefied nitrogen and pulverized by an external mechanical force.

The powder of shape memory polymer may be applied to the sheet in the following manner. First, the powder is mixed with a resin adhesive, and then the mixture is applied to the sheet using a roll or the like. Alternatively, the mixture or the individual components are applied to the sheet by spraying.

A preferred example of the resin adhesive used for application is a highly viscous polyurethane adhesive dissolved in a solvent such as toluene. The amount of the resin adhesive should preferably be 30 to 70 parts by volume for 100 parts by volume of the powder of shape memory polymer.

According to the method of the present invention, the shape memory property is imparted to the fibrous sheet in the following manner. First, a garment or any desired textile product is prepared from natural fiber and/or synthetic fiber, and then the powder of shape memory polymer is applyed (using a spray or the like) to the desired parts of the garment by the aid of a resin adhesive.

This method makes it possible to impart the shape memory property only to the collars, cuffs, and shoulder pads of garments or the creases of slacks and the pleats of skirts. Therefore, this method saves the amount of shape memory polymer compared with the conventional method. In addition, this method can be utilized easily by general consumers.

DETAILED DESCRIPTION OF PREFERRED EMBODIMENTS

Figure 1:
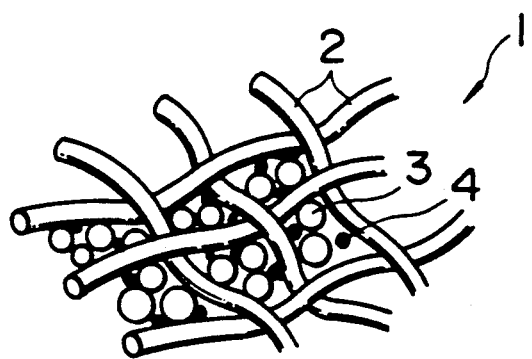
FIG. 1 is a schematic representation of the shape memory sheet of the present invention which has just been prepared.

The present invention will be described in more detail with reference to the following examples which are not intended to restrict the scope of the invention.

[1] PREPARATION OF THE POWDER OF SHAPE MEMORY POLYMER

First, polyurethane is prepared by the ordinary method according to the formulation shown in Table 1, and then the polyurethane is cooled below $-150°$ C. with liquefied nitrogen and pulverized by an external mechanical force. Thus there is obtained a powder of shape memory polymer having a particle diameter of 0.1 to 0.5 mm.

Synthesis of polyurethane elastomers by the prepolymer process.

First, a diisocyanate and a polyol are reacted in a specific molar ratio of [NCO]/[OH] to give a prepolymer. When the reaction is complete, the chain extender is added in an amount sufficient to establish a desired molar ratio of [chain extender]/[prepolymer]. After defoaming, the resulting mixture is cured for crosslinking reaction at 80° C. for one or two days in a constant temperature dryer. This process may be carried out with or without solvent.

Incidentally, E/E' in Table 1 is defined by:

$$E/E' = \frac{\text{Tensile modulus at (Tg} - 10° \text{ C.)}}{\text{Tensile modulus at (Tg} + 10° \text{ C.)}}$$

and the crystallinity (wt %) was measured by X-ray diffractometry.

TABLE 1

| Raw materials and molar ratio | M.W. | 1 | 2 | 3 | 4 | 5 | 6 | 7 | 8 | 9 | 10 |
|---|---|---|---|---|---|---|---|---|---|---|---|
| Diisocyanate | | | | | | | | | | | |
| 2,4-toluene diisocyanate | 174 | 1.5 | | | | 1.5 | | | | | |
| 4,4'-diphenylmethane diisocyanate | 250 | | | | | | 1.5 | | 1.5 | 1.5 | 1.5 |
| 4,4'-diphenylmethane diisocyanate (carbodiimide-modified) | 290 | | | | | | | 1.5 | | | |
| 4,4'-diphenylmethane diisocyanate (carbodiimide-modified) | 303 | | 1.5 | 1.5 | | | | | | | |
| hexamethylene diisocyanate | 168 | | | | | | | 1.5 | | | |
| Polyol | | | | | | | | | | | |
| polypropylene glycol | 400 | | | | | | | | | | |
| " | 700 | | | 1.0 | 1.0 | 1.0 | 1.0 | 1.0 | 1.0 | 1.0 | 1.0 |
| " | 1000 | | 0.88 | | | | | | | | |
| 1,4-butaneglycol adipate | 600 | | | | | | | | | | |
| " | 1000 | | | | | | | | | | |
| " | 2000 | | | | | | | | | | |
| polytetramethylene glycol | 650 | | | | | | | | | | |
| " | 850 | | | | | | | | | | |
| " | 1000 | | | | | | | | | | |
| polyethylene glycol | 600 | | | | | | | | | | |
| bisphenol-A + propylene oxide | 800 | 1.0 | | | | | | | | | |
| Chain extender | | | | | | | | | | | |
| ethylene glycol | 62 | | | | | | | | 0.51 | | |
| 1,4-butane glycol | 90 | 0.51 | | | | | | | | 0.51 | |
| bis(2-hydroxyethyl)hydroquinone | 198 | | | | | | | | | | |
| bisphenol-A + ethylene oxide | 327 | | | | | | | | | | |
| " | 360 | | 0.51 | 0.51 | 0.51 | 0.51 | 0.51 | 0.51 | | | |
| bisphenol-A + propylene oxide | 360 | | | | | | | | | | 0.51 |
| Measured values of physical properties | | | | | | | | | | | |
| Tg (°C) | | 24 | −10 | 15 | −11 | 14 | 16 | −45 | 9 | 6 | 12 |
| E/E' | | 170 | 73 | 69 | 23 | 129 | 133 | 20 | 117 | 128 | 97 |
| Crystallinity (wt %) | | | 20 | 20 | 30 | | | 25 | | | |

| Raw materials and molar ratio | M.W. | 11 | 12 | 13 | 14 | 15 | 16 | 17 | 18 | 19 | 20 |
|---|---|---|---|---|---|---|---|---|---|---|---|
| Diisocyanate | | | | | | | | | | | |
| 2,4-toluene diisocyanate | 174 | | | | | | | | | | |
| 4,4'-diphenylmethane diisocyanate | 250 | 1.5 | 1.5 | 1.5 | 1.2 | 1.8 | 1.35 | 1.35 | 1.35 | 1.35 | 1.35 |
| 4,4'-diphenylmethane diisocyanate (carbodiimide-modified) | 290 | | | | | | | | | | |
| 4,4'-diphenylmethane diisocyanate (carbodiimide-modified) | 303 | | | | | | | | | | |
| hexamethylene diisocyanate | 168 | | | | | | | | | | |
| Polyol | | | | | | | | | | | |
| polypropylene glycol | 400 | | | | | | | | | | |
| " | 700 | 1.0 | 1.0 | | 1.0 | 1.0 | 1.0 | | | | |
| " | 1000 | | | | | | | 1.0 | | | |
| 1,4-butaneglycol adipate | 600 | | | | | | | | 1.0 | | |
| " | 1000 | | | | | | | | | 1.0 | |
| " | 2000 | | | | | | | | | | 1.0 |
| polytetramethylene glycol | 650 | | | | | | | | | | |
| " | 850 | | | | | | | | | | |
| " | 1000 | | | | | | | | | | |
| polyethylene glycol | 600 | | | 1.0 | | | | | | | |
| bisphenol-A + propylene oxide | 800 | | | | | | | | | | |
| Chain extender | | | | | | | | | | | |
| ethylene glycol | 62 | | | | | | | | | | |
| 1,4-butane glycol | 90 | | | | | | | | | | |
| bis(2-hydroxyethyl)hydroquinone | 198 | | 0.51 | | | | | | | | |
| bisphenol-A + ethylene oxide | 327 | 0.51 | | | 0.21 | 0.81 | 0.36 | 0.36 | 0.36 | 0.36 | 0.36 |
| " | 360 | | | | | | | | | | |
| bisphenol-A + propylene oxide | 360 | | | | | | | | | | |
| Measured values of physical properties | | | | | | | | | | | |
| Tg (°C) | | 16 | −7 | −6 | −4 | 25 | 5 | −22 | 10 | −18 | −45 |
| E/E' | | 111 | 49 | 12 | 105 | 53 | 37 | 81 | 100 | 29 | 30 |
| Crystallinity (wt %) | | | 20 | 30 | | 20 | 25 | | | 25 | 25 |

| Raw materials and molar ratio | M.W. | 21 | 22 | 23 | 24 | 25 | 26 | 27 | 28 | 29 | 30 |
|---|---|---|---|---|---|---|---|---|---|---|---|
| Diisocyanate | | | | | | | | | | | |
| 2,4-toluene diisocyanate | 174 | | | | | | | 1.5 | 1.4 | 1.3 | 1.2 |
| 4,4'-diphenylmethane diisocyanate | 250 | 1.35 | 1.35 | 1.35 | 1.5 | 1.5 | 1.35 | | | | |
| 4,4'-diphenylmethane diisocyanate (carbodiimide-modified) | 290 | | | | | | | | | | |
| 4,4'-diphenylmethane diisocyanate (carbodiimide-modified) | 303 | | | | | | | | | | |
| hexamethylene diisocyanate | 168 | | | | | | | | | | |
| Polyol | | | | | | | | | | | |
| polypropylene glycol | 400 | | | | | | 1.0 | | | | |

TABLE 1-continued

| | | | | | | | | | | |
|---|---|---|---|---|---|---|---|---|---|---|
| " | 700 | | | 1.0 | 1.0 | | | | | |
| " | 1000 | | | | | | | | | |
| 1,4-butaneglycol adipate | 600 | | | | | | | | | |
| " | 1000 | | | | | | | | | |
| " | 2000 | | | | | | | | | |
| polytetramethylene glycol | 650 | 1.0 | | | | | | | | |
| " | 850 | | 1.0 | | | | | | | |
| " | 1000 | | | 1.0 | | | | | | |
| polyethylene glycol | 600 | | | | | | | | | |
| bisphenol-A + propylene oxide | 800 | | | | | | 1.0 | 1.0 | 1.0 | 1.0 |
| Chain extender | | | | | | | | | | |
| ethylene glycol | 62 | | | | | | | | | |
| 1,4-butane glycol | 90 | | | | | | | | | |
| bis(2-hydroxyethyl)hydroquinone | 198 | | | | | | 0.51 | 0.41 | 0.31 | 0.21 |
| bisphenol-A + ethylene oxide | 327 | 0.36 | 0.36 | 0.36 | 0.43 | 0.35 | 0.36 | | | |
| " | 360 | | | | | | | | | |
| bisphenol-A + propylene oxide | 360 | | | | | | | | | |
| Measured values of physical properties | | | | | | | | | | |
| Tg (°C.) | | −18 | −30 | −38 | 5 | 8 | 23 | 26 | 21 | 19 | 19 |
| E/E' | | 33 | 18 | 40 | 33 | 100 | 126 | 140 | 125 | 108 | 101 |
| Crystallinity (wt %) | | 25 | 25 | | 25 | 15 | 15 | 10 | 15 | 15 | 15 |

| Raw materials and molar ratio | M.W. | 31 | 32 | 33 | 34 | 35 | 36 | 37 | 38 | 39 | 40 |
|---|---|---|---|---|---|---|---|---|---|---|---|
| Diisocyanate | | | | | | | | | | | |
| 2,4-toluene diisocyanate | 174 | | | 1.5 | | | | | | | |
| 4,4'-diphenylmethane diisocyanate | 250 | 1.59 | 1.68 | | 1.3 | 1.7 | 1.59 | 1.68 | 1.5 | 1.5 | 1.81 |
| 4,4'-diphenylmethane diisocyanate (carbodiimide-modified) | 290 | | | | | | | | | | |
| 4,4'-diphenylmethane diisocyanate (carbodiimide-modified) | 303 | | | | | | | | | | |
| hexamethylene diisocyanate | 168 | | | | | | | | | | |
| Polyol | | | | | | | | | | | |
| polypropylene glycol | 400 | | | | | | | | | | |
| " | 700 | 1.0 | 1.0 | | 1.0 | 1.0 | 1.0 | 1.0 | | | |
| " | 1000 | | | | | | | | | | |
| 1,4-butaneglycol adipate | 600 | | | | | | | | | | |
| " | 1000 | | | | | | | | | | |
| " | 2000 | | | | | | | | | | |
| polytetramethylene glycol | 650 | | | | | | | | | | |
| " | 850 | | | | | | | | | | |
| " | 1000 | | | | | | | | | | |
| polyethylene glycol | 600 | | | | | | | | | | |
| bisphenol-A + propylene oxide | 800 | | | 1.0 | | | | | 1.0 | 1.0 | 1.0 |
| Chain extender | | | | | | | | | | | |
| ethylene glycol | 62 | | | | 0.31 | 0.71 | 0.51 | 0.51 | | | |
| 1,4-butane glycol | 90 | | | | | | | | 0.51 | | |
| bis(2-hydroxyethyl)hydroquinone | 198 | | | 0.51 | | | | | | 0.51 | 0.51 |
| bisphenol-A + ethylene oxide | 327 | | | | | | | | | | |
| " | 360 | 0.51 | 0.51 | | | | | | | | |
| bisphenol-A + propylene oxide | 360 | | | | | | | | | | |
| Measured values of physical properties | | | | | | | | | | | |
| Tg (°C.) | | 10 | 11 | 22 | 2 | 15 | 11 | 12 | 35 | 40 | 48 |
| E/E' | | 126 | 126 | 107 | 83 | 122 | 100 | 135 | 124 | 138 | 152 |
| Crystallinity (wt %) | | 15 | 20 | 15 | 20 | 15 | 15 | 10 | 10 | 5 | 5 |

[2] PREPARATION OF SHAPE MEMORY SHEET

Preparation Example 1

Figure 2:
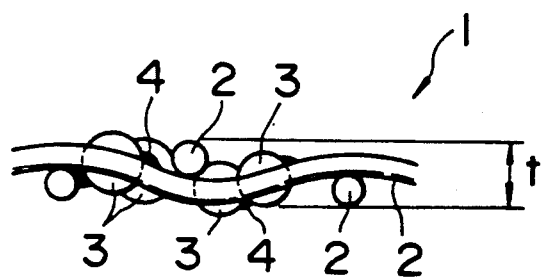
FIG. 2 is a sectional view showing the shape memory sheet shown in FIG. 1.

A powder of shape memory polyurethane was prepared according to the formulation No. 2 shown in Table 1. A highly viscous resin adhesive was prepared by dissolving polyurethane in toluene. The polyurethane powder and the resin adhesive were mixed in a ratio of 100:40 (by volume). The mixture was applied to a cotton woven fabric passing through rolls by means of the rolls. Thus there was obtained a sheet having the cross section as shown in FIGS. 1 and 2, in which reference numerals 2, 3, and 4 denote a cotton fiber, the shape memory polyurethane powder, and the resin adhesive, respectively, and t represents the thickness of the sheet after application.

The sheet 1 was annealed at 150° C. for 5 minutes. The resulting sheet is shown in section in FIG. 3. It should be noted that the cotton fiber 2 became flat and the shape memory polyurethane powder 3 formed a smooth film and the thickness t became smaller. Incidentally, this sheet has a Tg of −10° C.

Preparation Example 2

Figure 3:
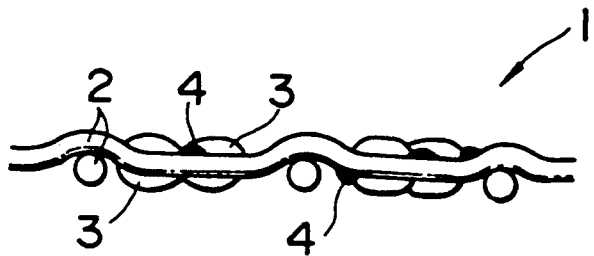
FIG. 3 is a schematic representation of the shape memory sheet shown in FIGS. 1 and 2 which has just undergone post curing.

A mixture of a powder of shape memory polyurethane and a highly viscous resin adhesive was prepared in the same manner as in Preparation Example 1. The mixture was applied to a nonwoven fabric of nylon-66 which has a heat-resisting temperature of 160°-180° C. (at which) annealing is carried out). Upon annealing in the same manner as in Preparation Example 1, there was obtained a sheet as shown in FIG. 3. Incidentally, this sheet has a Tg of −10° C.

Preparation Example 3

A mixture of a powder of shape memory polyurethane (according to the formulation No. 39 in Table 1)

and a resin adhesive was prepared in the same manner as in Preparation Example 1. The mixture was applied to a cotton woven fabric, followed by annealing, in the same manner as in Preparation Example 1. There was obtained a sheet as shown in FIG. 3. Incidentally, this sheet has a Tg of 40° C.

Preparation Example 4

A mixture of a powder of shape memory polyurethane and a highly viscous resin adhesive was prepared in the same manner as in Preparation Example 3. The mixture was applied to a nonwoven fabric of polypropylene which has a heat-resisting temperature of 160° C. (at which annealing is carried out). Upon annealing at 150° C. for 4 minutes, there was obtained a sheet as shown in FIG. 3. Incidentally, this sheet has a Tg of 40° C.

[3] USAGE OF SHAPE MEMORY SHEET

Usage Example 1

Each of the sheets obtained in Preparation Examples 1 and 2 was folded over and heated in a mold capable of producing the creases of slacks. The heating temperature was about 150° C. at which the polyurethane (according to formulation No. 2) is about to begin to flow. The folded sheet was kept at this temperature for 5 minutes and then cooled to normal temperature. Thus the folded shape was set for memory.

These sheets gave exactly the same hand as a woven fabric of cotton or a nonwoven fabric of nylon-66 when it was used at normal temperature.

Subsequently, these sheets were washed for 1 hour using a washing machine and dried. They did not wrinkle but retained their creases.

Usage Example 2

Each of the sheets obtained in Preparation Examples 3 and 4 was heated in a mold capable of producing the shape of shoulder pad. The heating temperature was about 150° C. at which the polyurethane (according to formulation No. 39) is about to begin to flow. The shaped sheet was kept at this temperature for 5 minutes and then cooled to normal temperature. Thus the shape of shoulder pad was set for memory.

These sheets gave a considerably hard hand, although not so hard as plastics plate. It retained the hand of woven fabric and nonwoven fabric and did not give any unpleasant feeling even when kept in contact with the human skin for a long time.

Subsequently, these sheets in the form of shoulder pad were washed for 1 hour using a washing machine and dried. They slightly wrinkled and deformed; but they restored their original shape, eliminating wrinkles and deformation. They retained their shape even when they were cooled below the Tg.

When they were warmed by contact with the human skin instead of a hair dryer, they restored their original shape within 20 seconds to 1 minute, eliminating wrinkles and deformation.

Usage Example 3

Each of the sheets obtained in Preparation Examples 3 and 4 was heated and softened at 50° C. (which is higher than Tg) and folded over. The folded sheet was held between two flat plates and cooled below Tg under a pressure of 0.5-2.0 kgf/mm², so that the folded shape was set for memory.

These sheets gave a considerably hard hand at normal temperature, as in Usage Example 2, although not so hard as plastics plate. It retained the hand of woven fabric and nonwoven fabric and did not give any unpleasant feeling even when kept in contact with the human skin for a long time.

Subsequently, these folded sheets were washed for 1 hour using a washing machine and dried. They slightly wrinkled and deformed; but they restored their original folded shape, eliminating wrinkles and deformation, when heated above Tg with a hair dryer. They retained their shape even when they were cooled below the Tg.

When they were warmed by contact with the human skin instead of a hair dryer, they restored their original shape within 20 seconds to 1 minute, eliminating wrinkles and deformation.

[4] APPLICATION OF THE METHOD OF THE PRESENT INVENTION

Application Example 1

A utility shirt was manufactured from a cotton woven fabric. The collar, cuffs, and front placket were sprayed with the same mixture of shape memory polyurethane powder and resin adhesive as in Preparation Example 1, using a pump-type household spray. After drying, these parts of the shirt were ironed as usual with a household iron, so that they remembered the shape.

This shirt gave the same feeling as that of an ordinary cotton woven fabric at normal temperature.

This shirt was washed in a washing machine for 1 hour and dried. The collar, cuffs, and front placket did not wrinkle at all; but other parts suffered a large number of wrinkles.

Application Example 2

A bag was manufactured from a nonwoven fabric of nylon having a heat-resisting temperature of 170° C. This bag was sprayed with the same mixture of shape memory polyurethane powder and resin adhesive as in Preparation Example 3, in the same manner as in Application Example 1. After drying, the sprayed part of the bag was ironed with a household iron, so that it remembered the flat shape.

The sprayed part of the bag gave a hard feeling outside but retained the same feeling as an ordinary nonwoven fabric inside.

This bag was washed in a washing machine for 5 hours and dried. The sprayed part slightly wrinkled and deformed and other parts suffered a large number of wrinkles and a great deal of deformation.

When the bag was heated to about 50° C. using a hair dryer, the sprayed part restored its original shape, eliminating wrinkles and deformation, within a few minutes; but other parts remained wrinkled and deformed.

As mentioned above, the present invention produces the following effects.

(1) The invention makes it possible to impart the shape memory property very easily to woven fabrics and nonwoven fabrics of natural fiber and/or synthetic fiber.

(2) The shape memory fibrous sheet of the invention can be used in various ways in various application areas depending on the Tg of the shape memory polymer powder and the method of imparting the shape memory property. It can be used in a broad range of districts, from cold to hot.

(3) The method of the present invention can be applied to the collars, cuffs, etc. of ready-made or used garments. It is suitable for the household use. It can be used easily in various ways for various purposes.

We claim:

1. A fibrous sheet having a shaped memory property which comprises a sheet made of natural fiber and/or synthetic fiber and a shaped memory polymer layer formed by a powder of shape memory polymer applied to the sheet fiber, the polymer undergoing large changes in its modulus of longitudinal elasticity around its glass transition point temperature, the polymer restoring the fibrous sheet to its original shape when heated to a temperature higher than the glass transition point temperature.

2. A fibrous sheet as claimed in claim 1, wherein the powder of shape memory polymer has a particle diameter larger than the diameter of the fiber used.

3. A fibrous sheet as claimed in claim 1, wherein the powder of shape memory polymer is used in an amount of 10–95wt % of the sheet of natural fiber and/or synthetic fiber.

4. A method of imparting a shaped memory property to a sheet product which comprises applying a powder of shape memory polymer to a desired part of a sheet product made of natural fiber and/or synthetic fiber, the shaped memory polymer undergoing changes in its modulus of longitudinal elasticity around its glass transition point temperature, the applied polymer restoring the sheet product to its original shape when heated to a temperature higher than the glass transition point temperature.

5. A method of imparting the shape memory property as claimed in claim 4, wherein the powder of shape memory polymer has a particle diameter larger than the diameter of the fiber used.

6. A method of imparting the shape memory property as claimed in claim 4, wherein the powder of shape memory polymer is used in an amount of 10–95 wt % of the sheet of natural fiber and/or synthetic fiber.

7. A method of imparting the shape memory property as claimed in claim 4, wherein the powder of shape memory polymer is one which is produced by cooling the shape memory polymer in pellet form to an extremely low temperature by the aid of liquefied gas and then pulverizing with an external mechanical force.

8. A method of imparting the shape memory property as claimed in claim 4 further comprising mixing a resin adhesive with the shape memory polymer powder.

9. A method of imparting the shape memory property as claimed in claim 8, wherein the resin adhesive is highly viscous and prepared by dissolving polyurethane in a solvent.

10. A method of imparting the shape memory property as claimed in claim 8, wherein the resin adhesive is used in an amount of 30–70 parts by volume for 100 parts by volume of the powder of shape memory polymer.

* * * * *